United States Patent [19]

Veldhuis et al.

[11] Patent Number: 4,896,362
[45] Date of Patent: Jan. 23, 1990

[54] SYSTEM FOR SUBBAND CODING OF A DIGITAL AUDIO SIGNAL

[75] Inventors: Raymond N. J. Veldhuis; Robbert G. van der Waal; Marcel Breeuwer, all of Eindhoven, Netherlands

[73] Assignee: U.S. Philips Corporation, New York, N.Y.

[21] Appl. No.: 184,746

[22] Filed: Apr. 22, 1988

[30] Foreign Application Priority Data

Apr. 27, 1987 [NL] Netherlands ............. 8700985

[51] Int. Cl.⁴ ..................... G10L 7/04; G10L 9/18
[52] U.S. Cl. ........................... 381/30; 381/41; 381/37
[58] Field of Search ............ 364/513.5; 381/29-42; 84/1.01

[56] References Cited

U.S. PATENT DOCUMENTS

| | | | |
|---|---|---|---|
| 4,281,218 | 10/1979 | Chuang et al. | 381/41 |
| 4,314,100 | 2/1982 | Ruether et al. | 381/42 |
| 4,449,190 | 5/1984 | Flanagan et al. | 364/513.5 |
| 4,535,472 | 8/1985 | Tomcik | 381/31 |
| 4,569,075 | 2/1986 | Nussbaumer | 381/29 |

OTHER PUBLICATIONS

Klatt, "A Digital Filter Bank for Spectral Matching", IEEE ICASSP, Apr. 1976, pp. 573-576.

Primary Examiner—Emanuel S. Kemeny
Assistant Examiner—David D. Knepper
Attorney, Agent, or Firm—Algy Tamoshunas; Marianne R. Rich

[57] ABSTRACT

A system for subband coding of a digital audio signal x(k) includes in the coder (1) a filter bank (3) for splitting the audio signal band, with sampling rate reduction, into subbands (p=1, ... P) of approximately critical bandwidth and in the decoder (2) a filter bank (5) for merging these subbands, with sampling rate increase. For each subband (p) the coder (1) comprises a detector (7(p)) for determining a parameter G(p;m) representative of the signal level in a block (p;m) of M samples of the subband signal $x_p(k)$ as well as a quantizer (8(p)) for adaptively block quantizing this subband signal in response to parameter G(p;m), and the decoder (2) comprises a dequantizer (9(p)) for adaptively block dequantizing the quantized subband signal $s_p(k)$ in response to parameter G(p;m). The quantizing characteristics are related to the noise-masking curve of the human auditory system, owing to which a high-quality of the replica x̂(k) of audio signal x(k) is attained with an average number of approximately 2.5 bits per sample for representing the output signals of the coder (1). The occasional audibility of quantizing noise in this replica x̂(k) is reduced effectively in that the coder (1) and decoder (2) contain identical bit allocation means (23, 24) responsive to a set of parameters G(p;m) for the higher group of subbands ($p_{im} \leq p \leq P$) within an allocation window (FIG. 5) for allocating a number of B(p;m) bits per sample from a fixed predetermined number of B bits for this allocation window to the quantizer (8(p)) and the dequantizer (9(p)) for the block (p;m) of subband signal $x_p(k)$ and $s_p(k)$, respectively.

4 Claims, 8 Drawing Sheets

| p | $f_{co}$ [Hz] | W(p) [Hz] | L(p) | B(p) |
|---|---|---|---|---|
| 1 | 0 | 86 | 86 | 25 | 4.64 |
| 2 | 86 | 172 | 86 | 25 | 4.64 |
| 3 | 172 | 258 | 86 | 25 | 4.64 |
| 4 | 258 | 345 | 86 | 25 | 4.64 |
| 5 | 345 | 517 | 172 | 25 | 4.64 |
| 6 | 517 | 689 | 172 | 25 | 4.64 |
| 7 | 689 | 861 | 172 | 25 | 4.64 |
| 8 | 861 | 1034 | 172 | 25 | 4.64 |
| 9 | 1034 | 1206 | 172 | 25 | 4.64 |
| 10 | 1206 | 1378 | 172 | 25 | 4.64 |
| 11 | 1378 | 1550 | 172 | 25 | 4.64 |
| 12 | 1550 | 1723 | 172 | 25 | 4.64 |
| 13 | 1723 | 2067 | 345 | 25 | 4.64 |
| 14 | 2067 | 2412 | 345 | 19 | 4.25 |
| 15 | 2412 | 2756 | 345 | 13 | 3.70 |
| 16 | 2756 | 3101 | 345 | 9 | 3.17 |
| 17 | 3101 | 3445 | 345 | 7 | 2.81 |
| 18 | 3445 | 4134 | 689 | 7 | 2.81 |
| 19 | 4134 | 4823 | 689 | 7 | 2.81 |
| 20 | 4823 | 5513 | 689 | 7 | 2.81 |
| 21 | 5513 | 6891 | 1378 | 7 | 2.81 |
| 22 | 6891 | 8269 | 1378 | 5 | 2.32 |
| 23 | 8269 | 11025 | 2756 | 3 | 1.58 |
| 24 | 11025 | 13781 | 2756 | 3 | 1.58 |
| 25 | 13781 | 16538 | 2756 | 3 | 1.58 |
| 26 | 16538 | 22050 | 5513 | 3 | 1.58 |

SYSTEM FOR SUBBAND CODING OF A DIGITAL AUDIO SIGNAL

BACKGROUND OF THE INVENTION

The invention relates to a digital system including a coder and a decoder for subband coding of a digital audio signal having a given sampling rate 1/T, the coder comprising:

analysis filter means responsive to the audio signal, for generating a number of P subband signals, the analysis filter means dividing the audio signal band according to the quadrature mirror filter technique, with sampling rate reduction, into successive subbands of band numbers p ($1 \leq p \leq P$) increasing with the frequency, the bandwidth and the sampling rate for each subband being an integral submultiple of 1/(2T) and 1/T, respectively, and the bandwidths of the subbands approximately corresponding with the critical bandwidths of the human auditory system in the respective frequency ranges, means responsive to each of the subband signals, for determining a characteristic parameter G(p;m) which is representative of the signal level in a block having a same number of M signal samples for each subband, $\underline{m}$ being the number of the block, means for adaptively quantizing the blocks of the respective subband signals in response to the respective characteristic parameters G(p;m);

and the decoder comprising:

means for adaptively dequantizing the blocks of the quantized subband signals in response to the respective characteristic parameters G(p;m), synthesis filter means responsive to the dequantized subband signals for constructing a replica of the digital audio signal, these synthesis filter means merging the subbands to the audio signal band according to the quadrature mirror filter technique, with sampling rate increase.

A system for subband coding of a similar structure is known from the article entitled "The Critical Band Coder—Digital Encoding of Speech Signals Based on the Perceptual Requirements of the Auditory System" by M. E. Krasner, published in Proc. IEEE ICASSP 80, Vol. 1, pp. 327–331, Apr. 9–11, 1980.

In this known system, use in made of a subdivision of the speech signal band into a number of subbands, whose bandwidths approximately correspond with the bandwidths of the critical bands of the human auditory system in the respective frequency ranges (compare FIG. 2 in the article by Krasner). This subdivision has been chosen because on the basis of psychoacoustic experiments it may be expected that in a suchlike subband the quantizing noise will be optimally masked by the signals within this subband when the quantizing takes account of the noise-masking curve of the human auditory system (this curve indicates the threshold for masking the noise in a critical band by a single tone in the centre of the critical band, compare FIG. 3 in the article by Krasner).

In the case of a high-quality digital music signal, represented according to the Compact Disc standard with 16 bits per signal sampling at a sample rate of 1/T=44.1 kHz, it appears that the use of this known subband coding with a suitably chosen bandwidth and a suitably chosen quantizing for the respective subbands results in quantized output signals of the coder which can be represented with an average number of 2.5 bits per signal sample, while the quality of the replica of the music signal does not perceptibly differ from that of the original music signal in virtually all passages of nearly all sorts of music signals. However, in certain passages of some sorts of music signals the quantizing noise is still audible. The audibility of the quantizing noise can be reduced by increasing the number of quantizing levels, but this implies that the average number of bits per sample of the quantized output signals of the coder than has to be increased too.

SUMMARY OF THE INVENTION

The invention has for its object to provide a digital system of the type mentioned in the opening paragraph for subband coding of high-quality audio signals, in which the audibility of quantizing noise in the replica of the audio signals is reduced in an effective manner without increasing the average number of bits per sample of the quantized output signals of the coder.

The digital system for subband coding of a digital audio signal in accordance with the invention is characterized in that the respective quantizing means in the coder and the respective dequantizing means in the decoder for each of the subbands having a band number $\underline{p}$ smaller than $p_{im}$ are arranged for the respective quantizing and dequantizing of the subband signals with a fixed number of B(p) bits, the subband having band number $p_{im}$ being situated in the portion of the audio signal band with the lowest thresholds for masking noise in critical bands of the human auditory system by single tones in the centre of the respective critical bands, the coder and the decoder each further include bit allocation means responsive to the respective characteristic parameters G(p;m) of the subbands having a band number $\underline{p}$ not smaller than $p_{im}$ within an allocation window having a duration equal to the block length for the subband having the band number $p_{im}$, for allocating a number of B(p;m) bits from a predetermined fixed total number of B bits for the allocation window to the respective quantizing means in the coder and the respective dequantizing means in the decoder for the signal block having block number $\underline{m}$ of the subband having band number $\underline{p}$, the bit allocation means each comprising:

comparator means for comparing within each allocation window the characteristic parameters G(p;m) to respective threshold T(p) for the subbands having band number $\underline{p}$ and for generating respective binary comparator signals C(p;m) having a first value C(p;m) = "1" for a parameter G(p;m) not smaller than the threshold T(p) and a second value C(p;m) = "0" in the opposite case, these thresholds T(p) being related to the threshold of the human auditory system for just perceiving single tones, means for storing a predetermined allocation pattern {B(p)} of numbers of B(p) quantizing bits for subbands having respective band numbers $\underline{p}$, these numbers B(p) being related to the thresholds for masking noise in the critical bands of the human auditory system by single tones in the centre of the respective critical bands, means for determining an allocation pattern {B(p;m)} of respective numbers of B(p;m) quantizing bits for the signal-block having the block number $\underline{m}$ of the subband having band number $\underline{p}$, in response to the allocation pattern stored {B(p)} and the respective characteristic parameters G(p;m) and comparator signals C(p;m), the allocation pattern {B(p;m)} being equal to the allocation pattern stored {B(p)} if all comparator signals C(p;m) within an allocation window have the said first value C(p;m)="1" and, in the opposite case, the allocation pattern {B(p;m)} in the opposite case being formed by not allocating quantizing bits to blocks within an allocation window having a comparator signal of the said second value C(p;m)="0" and by allocating the sum S of the numbers of B(p) quantizing bits available within an allocation window for the latter blocks in the allocation pattern stored {B(p)} to the blocks within an allocation window having a comparator signal of the said first value C(p;m)="1" and having the largest values of the characteristic parameter G(p;m), for obtaining numbers of B(p;m) quantizing bits which are greater than the corresponding numbers of B(p) quantizing bits in the allocation pattern stored {B(p)},
means for supplying the allocation pattern {B(p;m)} determined thus to the respective quantizing means in the coder and the respective dequantizing means in the decoder.

The measures according to the invention are based on the recognition that the quantizing noise is especially audible in music passages presenting single tones. During such passages the greater part of the subbands have very little or no signal energy from the mid-audio frequency range onwards, whereas each of the few remaining subbands has no more than one spectral component possessing significant signal energy. If this spectral component is situated around lower or upper boundary of the subband, the critical band of the human auditory system for this spectral component will not correspond with this subband. The quantizing noise, however, is spread out over the entire subband, so that the quantizing noise outside the critical band is not masked for this spectral component as contrasted with the case is which various spectral components possessing significant energy occur in the subband or in adjacent subbands and the mutually overlapping critical bands sufficiently mask the quantizing noise for the various spectral components. In accordance with the invention no quantizing bits are allocated to blocks of subband signals within an allocation window which contain little or no signal energy, and the quantizing bits "saved" thus are used for a finer quantizing of the blocks of subband signals within the same allocation window which do contain significant signal energy, starting with a block containing the highest signal energy and ending when the number of remaining "saved" quantizing bits is no longer sufficient for a further quantizing refinement or when all blocks having significant signal energy have undergone a sufficiently fine quantizing. The total number of quantizing bits for the allocation window is not changed and the reallocation of any "saved" quantizing bits is carried out in response to the characteristic parameters representing the signal energy in a block and which are already present in both coder and decoder. The refined quantization during music passages presenting single tones thus results in an effective reduction of the audibility of quantizing noise without the need of increasing the average number of quantizing bits per output signal sample of the coder. Extensive listening tests with widely varying sorts of music signals have shown that generally no quantizing noise is audible any longer during music passages presenting single tones thanks to the measures according to the invention.

The only sporadically occurring cases of audible quantizing noise prove to relate predominantly to passages of music in which the music signal has strong attacks, the signal energy in substantially all subbands suddenly changing considerably. In a preferred embodiment of the present system for subband coding of a digital audio signal also the audibility of the quantizing noise during passages of music with strong attacks can be reduced effectively because the bit allocation means in the coder and the decoder also include means which in response to successive characteristic parameters G(p;m) and G(p;m+1) of each subband having a band number $\underline{p}$ exceeding $p_{im}$:
  do not allocate any quantizing bits to block (p;m+1) and add the numbers of B (p;m+1) quantizing bits available for this block to the said sum S, if the ratio $Q=G(p;m)/G(p;m+1)$ ratio is greater than a predetermined value R(p) of the order of $10^2$ and block (p;m+1) is situated within the allocation window;
  do not allocate any quantizing bits to block (p;m) and add the numbers of B(p;m) quantizing bits available for this block to the said sum S, if the ratio $Q=G(p;m)/G(p;m+1)$ is smaller than the value 1/R(p) and block (p;m) is situated within the allocation window.

These measures exploit the psychoacoustic effect of temporal masking, which means the property of the human auditory system that its threshold for perceiving signals shortly before and shortly after the occurrence of another signal which has a relatively high signal energy appears to be temporarily higher than in the absence of the latter signal. More specifically, in this preferred embodiment no quantizing bits are allocated to blocks with a relatively low signal energy which occur shortly before and shortly after occurrence of blocks with a relatively high signal energy, and the quantizing bits "saved" thus are used for the more refined quantizing of these blocks having a relatively high signal energy and the consequent reduction of the quantizing noise during these blocks, whereas the fact that the quantizing bits are not allocated to adjacent blocks with a relatively low signal energy does in fact not result in audible distortion owing to the temporal masking by the human auditory system.

The invention and the advantages realized therewith will now be explained in the following description of an embodiment with reference to the drawings.

DETAILED DESCRIPTION OF THE PREFERRED EMBODIMENTS

Figure 1:
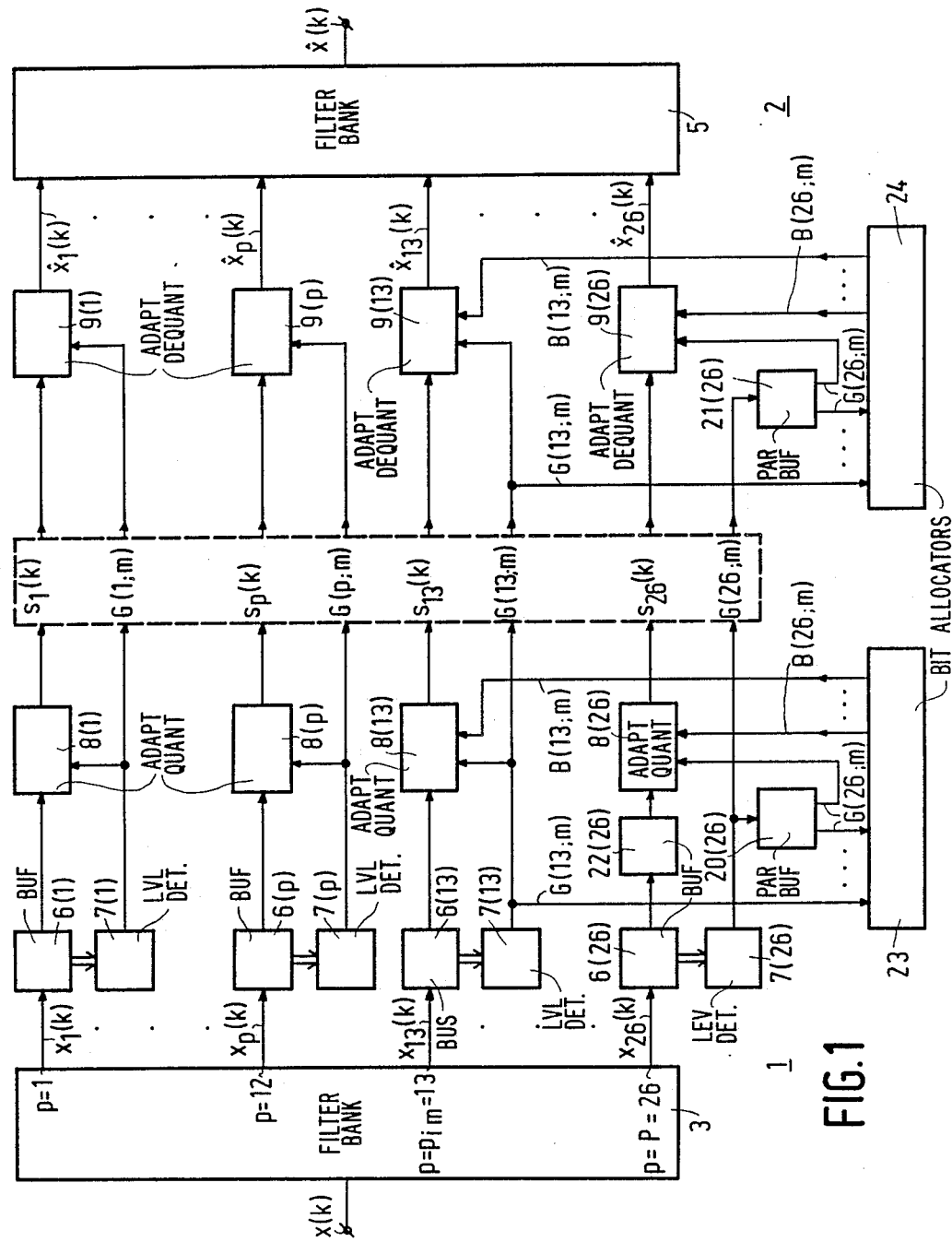
FIG. 1: Shows a block diagram of a digital system for subband coding of a digital audio signal in accordance with the invention.

In FIG. 1 a simplified functional block diagram is shown of a digital system having a coder 1 and a decoder 2 for subband coding of a digital audio signal of a given sampling rate 1/T. The basic structure of such a system is generally known, see the above article by Krasner and the chapter of "Subband Coding" in the book entitled "Digital Coding of Waveforms" by N. S. Jayant and P. Noll, Prentice-Hall, Inc., Engelwood Cliffs, New Jersey, 1984, pp. 486–509. This basic structure will now be described with reference to FIG. 1 for the case of a digital high-quality music signal which is in accordance with the Compact Disc standard is represented with 16 bits per signal sample at a sampling rate of $1/T = 44.1$ kHz. In this description digital signals are denoted in a conventional manner, $x(k)$ being a quantized signal sample of signal $x(t)$ at instant $t = kT_s$ and the relevant sampling rate $1/T_s$ appearing from the context.

In coder 1 a music signal $x(k)$ having a sampling rate $1/T_s = 1/T = 44.1$ kHz is applied to an analysis filter bank 3 which divides the music signal band of 0–22.05 kHz according to the quadrature mirror filter technique, with sampling rate reduction, into a number of $p = 26$ subbands of band numbers $p(1 \leq p \leq P = 26)$ increasing with the rate. For each subband the bandwidth $W(p)$ is an integral submultiple of the bandwidth $1/(2T) = 22.05$ kHz of the music signal band and the sampling rate $1/T_s(p)$ is equal to the same submultiple of the sampling rate $1/T = 44.1$ kHz of music signal $x(k)$ at the input of filter bank 3. In response to this music signal $x(k)$ filter bank 3 generates a number of $P = 26$ subband signals $x_p(k)$ which are quantized blockwise, the signal block for each subband containing a same number of $M = 32$ signal samples. After being transmitted via and-/or stored in a medium 4 the quantized subband signals $s_p(k)$ are dequantized blockwise in decoder 2 and the resulting dequantized subband signals $\hat{x}_p(k)$ are applied to a synthesis filter bank 5. The subbands obtained in filter bank 3 of coder 1 are merged in this synthesis filter bank 5 to become the music signal bank of 0–22.05 kHz according to the quadrature mirror filter technique, with sampling rate increase. Thus the filter bank 5 constructs a replica $\hat{x}(k)$ of the original music signal $x(k)$.

For the quantizing of the subband signals $x_p(k)$ known block-adaptive PCM methods are used. Thereto, coder 1 contains of each subband a signal buffer 6 (p), in which a signal block of $M = 32$ samples is stored temporarily. To each signal buffer $6(p)$ a level detector $7(p)$ is connected to determine for each block stored having block number $\underline{m}$ a characteristic parameter $G(p;m)$ representative of the signal level in this block. This characteristic parameter $G(p;m)$ is used for an optimal adjustment of an adaptive quantizer $8(p)$ for quantizing the signal block stored having block number $\underline{m}$. The block of quantized subband signal samples $s_p(k)$ obtained thus is applied in decoder 2 to an adaptive dequantizer $9(p)$ which is also adjusted by characteristic parameter $G(p;m)$. As is well known, the signal level can be represented by the average value of the amplitude or the power of the signal samples of a block, but also by the peak value of the amplitude of the signale samples in a block. The representation utilized in the level detector $7(p)$ depends on the type of quantizer $8(p)$. Since the same characteristic parameter $G(p;m)$ is used in quantizer $8(p)$ and in dequantizer $9(p)$, level detector $7(p)$ has to quantize this parameter $G(p;m)$, in the case of a high-quality music signal an 8-bit logarithmic quantizing being effected.

Figure 2A:
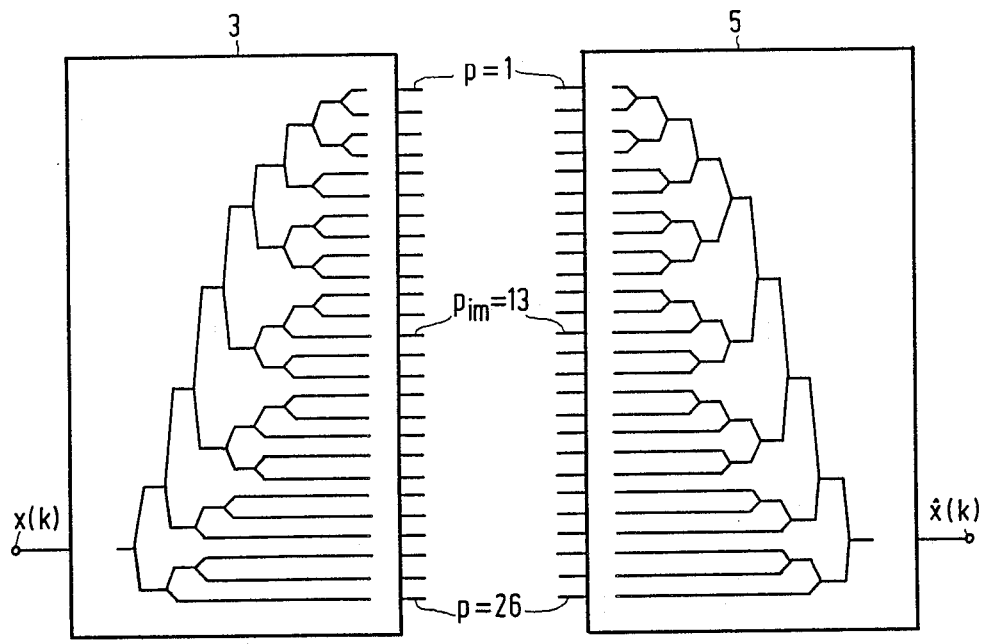
FIG. 2A: shows a diagram of a series of band splittings and band mergings which can be used in the filter banks of the system shown in FIG. 1.
Figure 2B:
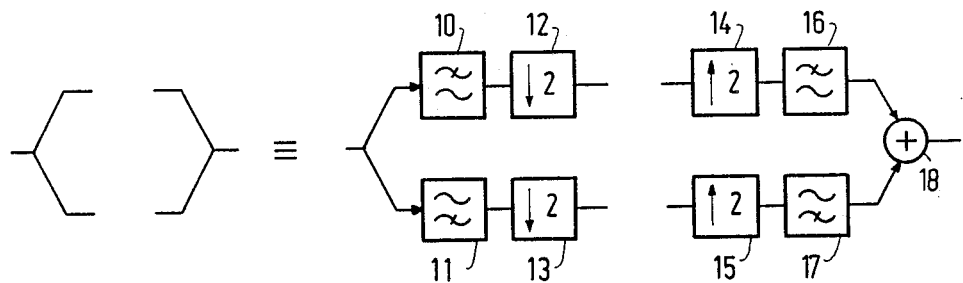
FIG. 2B: shows a block diagram of a band splitting and a band merging according to the quadrature mirror filter technique
Figure 2C:
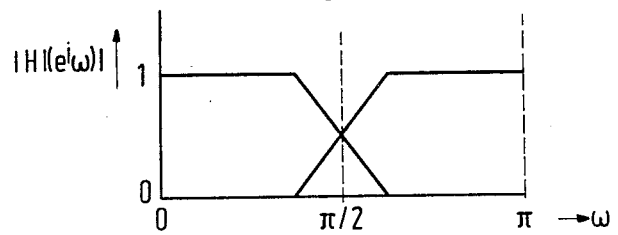
FIG. 2C: shows the amplitude response of the filters used in FIG. 2B.

In the present system a subdivision of the music signal band of 0–22.05 kHz is made according to a perceptual criterion, the bandwidths $W(p)$ of the subbands having the respective band numbers $p(1 \leq p \leq 26)$ approximately corresponding to the critical bandwidths of the human auditory system in the respective frequency ranges (see FIG. 2 in the above article by Krasner). In view of a simple implementation of filter banks 3 and 5, the quadrature mirror filter technique is used for the subdivision into subbands and the corresponding reduction of the sampling rate and the merging of the subbands and the corresponding increase of the sampling rate, respectively. According to this quadrature mirror filter technique the subdivision is effected as a series of band splittings and the reunion as a series of band mergings. For the present case of music signal band of 0–22.05 kHz FIG. 2A shows the diagram of the series of splittings and mergings used in filter banks 3 and 5 for obtaining subbands of an approximately critical bandwidth. FIG. 2B shows how each band splitting and corresponding band merging is realized. The band of the input signal is divided into a lower band and an upper band with the aid of a low-pass filter 10 and a high-pass filter 11, respectively, the amplitude responses of these filters 10 and 11 being each other's image. This image is represented in a stylized form in FIG. 2C showing the magnitude of frequency response $H(e^{j\omega})$ as a function of the normalized radial frequency $\omega = 2\pi f T_s$, where $1/T_s$ is the sampling rate of the input signal having the bandwidth $1/(2T_s)$. The sampling rate of the output signals of filters 10, 11 is subsequently halved by means of 2:1 decimators 12, 13. At this band merging, this halving of the sampling rate is cancelled by means of 1:2 interpolators 14, 15. As undesired periodical repetitions of the signal spectra of the lower and upper bands occur during this interpolation, the output signals of the 1:2 interpolators 14, 15 are applied to a low-pass filter 16 and a high-pass filter 17, respectively, for selecting the desired lower and upper band. The frequency responses of these filters 16 and 17 are again each other's image, filter 16 corresponding to filter 10 and filter 17 co responding to filter 11 (disregarding a sign inversion). The output signals of filters 16 and 17 are added together by means of an adder 18 to construct a replica of the input signal of filters 10 and 11. The diagram of FIG. 2A shows that an equal number of splittings and mergings is not required for all subbands for the subbands of the numbers p=1–4 this is 8, but for the subband of the number p=26 this is only 2. Since the quadrature mirror filters 10, 11 and 16, 17 form the most important sources of the signal delays in the filter banks 3 and 5, the signals in the separate subbands have to be delayed by different amounts in order to maintain in the constructed replica of the music signal the original time relation between the signals in the respective frequency ranges.

Figures 3, 4:
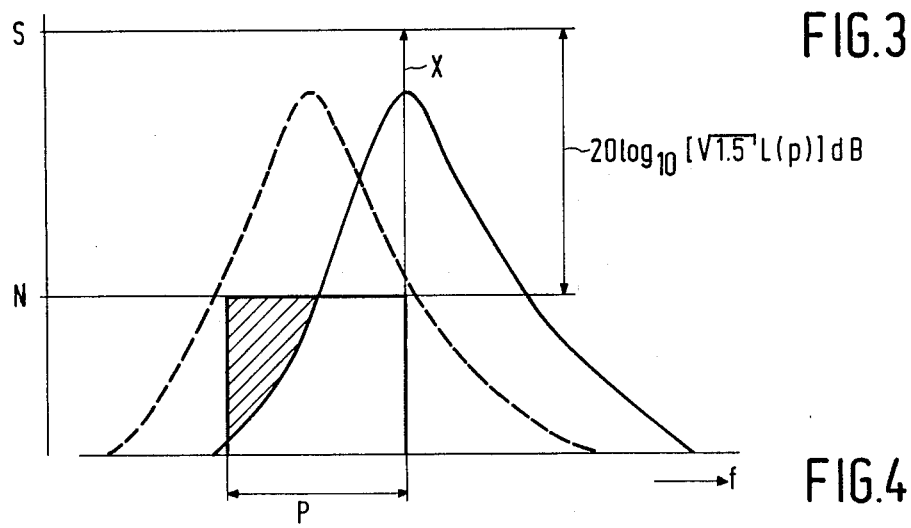
FIG. 3: shows a table of data relating to the subbands obtained from applying the diagram shown in FIG. 2A to a 0–22.05 kHz music signal band.
FIG. 4: shows a frequency diagram for qualitatively explaining how quantizing noise sometimes becomes audible during music passages presenting single tones.

FIG. 3 shows a Table of data relating to the subbands obtained from applying the diagram of FIG. 2A to the 0–22.05 kHz music signal band. The first column indicates the band numbers p, the second and third columns give the values $f_{co}$ of the lower and upper boundary of the subband, respectively, and the fourth column gives the value W(p) of the width of the subband, the values in the second, third and fourth columns being rounded to integers. The values W(p) are the result of a practical compromise between aiming at as good an approximation as possible of the critical bandwidths values of the human auditory system as mentioned in publications on psychoacoustic experiments, and aiming at as little complexity as possible of the filter banks 3 and 5 when implementing the quadrature mirror filter technique.

The choice of a division into subbands of approximately critical bandwidths is made because, on the basis of psychoacoustic experiments, it may be expected that the quantizing noise in a subband will then be optimally masked by the signals in this subband. The noise-masking curve of the human auditory system providing the threshold for masking noise in a critical band by a single tone in the centre of this critical band is the starting point for the quantizing of the respective subband signals (compare FIG. 3 in the above article by Krasner). The number of quantizing levels L(p) for a subband of band number p is now related to this noise-masking curve in a manner such that in each subband the signal-to-noise ratio is sufficiently high for not perceiving the quantizing noise. For this purpose a number of L(p)=25 quantizing levels appears to be amply sufficient in the mid-frequency portion of the audio signal band, where the noise-masking curve possesses its lowest values, whilst for higher frequencies ever decreasing numbers of L(p) will suffice. The latter also holds for the low-frequency portion of the audio signal band, but in the present embodiment this option is not utilized as it hardly contributes to a reduction of the number of bits required to represent the output signals of the coder, as will be explained hereinafter. The numbers of L(p) quantizing levels used in the present case are shown in the fifth column of the Table in FIG. 3. As is well known, a number of L(p) quantizing levels corresponds with a number of $B(p) = \log_2[L(p)]$ quantizing bits per signal sample. The values of these numbers B(p) are shown in the sixth column of the Table in FIG. 3, these values being rounded off to two decimal places. When the quantizers 8(p) and dequantizers 9(p) are implemented in practice, the numbers B(p) are slightly higher. For example, for quantizing a block of M=32 samples of a subband signal $x_p(k)$ having a number of L(p)=25 quantizing levels the theoretical number of quantizing bits per signal sample is $B(p) = \log_2(25) = 4.64$ and the theoretically required total number of quantizing bits for the block is $32\log_2(25) = 148.60$. The practically required total number of quantizing bits for the block, however, is no less than 149 so that in practice the number of quantizing bits per signal sample has a value of at least B(p)=149/32=4.66.

The number of bits per second required for quantizing a subband signal $x_p(k)$ is indicated by the product of the sampling rate 2W(p) and the number of B(p) quantizing bits per signal sample. Then the values of W(p) and B(p) in the Table of FIG. 3 show that the quantizing of all subband signals $x_p(k)$ requires a theoretical bit capacity of 98.225 kbits/s. Considering the relatively low values of the sampling rate 2W(p) for the subbands having the lowest band numbers p, it will be evident that it is hardly advisable to make use of the possibility of reducing there the number of B(p) quantizing bits per signal sample without thus affecting the perceptibility of quantizing noise. For quantizing the characteristic parameters G(p;m) of each block of M=32 signal samples 8 bits are used, as was stated before, which narrows down to 8/32=0.25 bit per signal sample. From the value of the sampling rate 1/T=44.1 kHz of the music signal it then follows that the quantizing of all characteristic parameters G(p;m) requires a bit capacity of 11.025 kbits/s. The overall bit capacity required for representing all output signals of the coder 1 in FIG. 1 is thus 109.250 kbits/s, so that these output signals can be represented with an average number of 2.477 bits per signal sample in lieu of 16 bits per signal sample. As already stated before, the value of B(p) will slightly higher in practice than the value shown in the table, the representation of the output signals of the coder 1 in practice requiring a bit capacity of approximately 110 kbits/s and thus an average number of approximately 2.5 bits per signal sample.

When an analog version x(t) of music signal x(k) is formed at the input of coder 1 with the aid of a 16-bit digital to analog converter and also an analog version $\hat{x}(t)$ of replica $\hat{x}(k)$ at the output of the decoder 2, and these analog versions x(t) and $\hat{x}(t)$ are compared with each other during listening tests, the quality of the replica $\hat{x}(t)$ turns out not to differ perceptibly from the high quality of the original music signal x(t) in substantially all passages of nearly all kinds of music signals despite the above significant reduction of the required bit capacity. In certain passages of specific kinds of music signals, however, the quantizing noise is still audible. Basically, the audibility of the quantizing noise can always be reduced by having the number of L(p) quantizing levels for all subbands exceed the numbers in the fifth column of the Table shown in FIG. 3, but this automatically means that the number of B(p) quantizing bits per signal sample for all subbands exceeds the numbers in the sixth column of this Table, resulting in the fact that the representation of the output signals of the coder 1 requires a larger bit capacity too.

From extensive research into the causes of the occasional audibility of quantizing noise, the Applications have gained the recognition that the quantizing noise is especially audible in music passages presenting single tones. During such music passages the greater part of the subbands have very little or no signal energy from the mid frequency portion of the music signal band onwards, whereas only a single spectral component having significant signal energy occurs in each of the few remaining subbands. With reference to FIG. 4 it will be qualitatively explained how the quantizing noise sometimes becomes audible in this case. FIG. 4 shows the power S of a single sinusoid component X near the upper boundary of a subband of band number $p$. When using a sufficiently large number of $L(p)$ quantizing levels for quantizing the sinusoid component X, the quantizing noise is distributed substantially uniformly over the whole subband and the power N of the quantizing noise is lower by an amount of approximately $$20 \log_{10}[\sqrt{1.5} L(p)] dB$$

than the power S, as shown in FIG. 4. In a stylized form FIG. 4 also shows two threshold curves for noise-masking in critical bands of the human auditory system by a sinusoid component in the centre of this frequency band. The curve shown in the dashed line represents a sinusoid component having power S situated in the centre of the subband of band number $p$, whilst the curve in a solid line represents sinusoid component X also having power S but now situated near the upper boundary of the subband of band number $p$. From FIG. 4 it is evident that in the case of the dashed-line curve the quantizing noise is fully masked, but that in the case of the solid curve the shaded part of the quantizing noise lies above the threshold curve and is thus audible in music passages presenting single tones. In the more general case when in addition to spectral component X various other spectral components having significant energy occur in the subband of band number $p$ and/or in the neighbouring subbands, the shaded portion of the quantizing noise in FIG. 4, however, will no longer be audible, because in this case the overlapping threshold curves for the respective spectral components will result in a compound threshold curve situated above the quantizing noise and this quantizing noise will thus be masked adequately.

In accordance with the invention, the system of FIG. 1 is now arranged in the following manner to combat the audibility of quantizing noise during music passages presenting single tones without the average number of quantizing bits per sample of the quantizing output signals being increased. The subbands are divided into a first group of band numbers $p$ smaller than $p_{im}(1 \leq p \leq p_{im})$ and a second group of band numbers $p$ not smaller than $p_{im}(p_{im} \leq p \leq P)$, in which the subband of band number $p_{im}$ is situated in the portion of the audio signal band having the lowest threshold values for masking noise in critical bands of the human auditory system by single tones in the centre of the respective critical bands. In the present embodiment $p_{im} = 13$ is chosen, so that the dividing line between the first and the second group of subbands is situated at the frequency $f = 1723$ Hz. The quantizers $8(p)$ and dequantizers $9(p)$ for each of the subbands of the first group $(1 \leq p \leq 12)$ are arranged for quantizing and dequantizing the subband signals by a fixed number of $B(p)$ bits per signal sample, in the present embodiment the same values of $B(p) = \log_2[L(p)]$ as shown in the table of FIG. 3 being chosen, thus $L(p) = 25$ and $B(p) = 4.64$.

For the quantizing and dequantizing of the signals in the subbands of the second group $(13 \leq p \leq 26)$ a fixed total number of B bits is predetermined indeed for a time interval corresponding with one block of $M = 32$ signal samples of the signal in the subband having band number $p_{im} = 13$ but the number of $B(p;m)$ quantizing bits per signal sample for the signal block of block number $m$ of the subband of band number $p$ is now determined by the set of all characteristic parameters $G(p;m)$ of the second group $(13 \leq p \leq 26)$ within the aforementioned time interval. Since these parameters $G(p;m)$ are available both in coder 1 and decoder 2, the numbers $B(p;m)$ in coder 1 and decoder 2 can be determined in the same manner without the need of transferring extra information to decoder 2.

Figure 5:
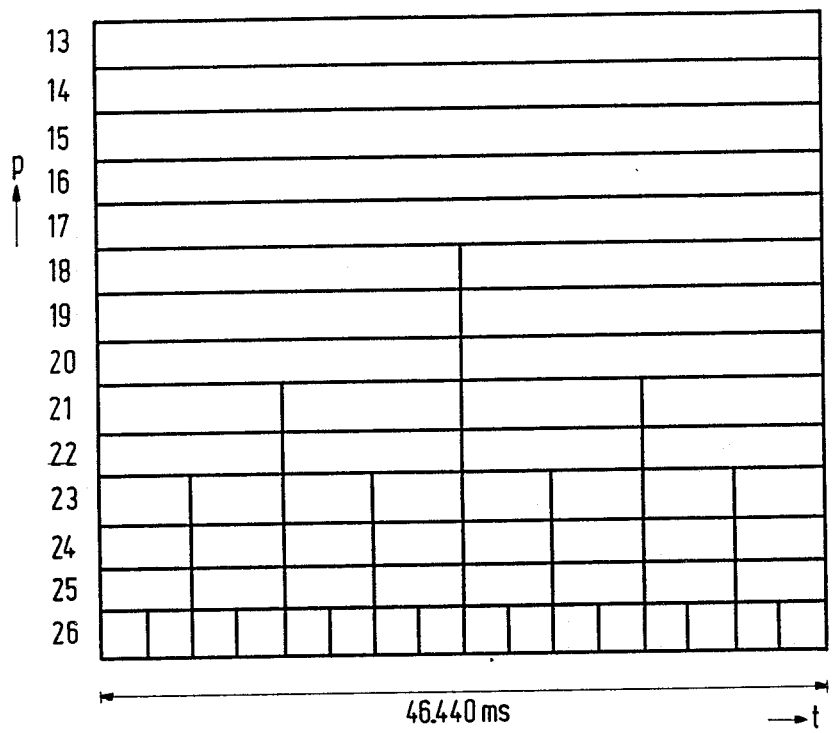
FIG. 5: shows an example of an allocation window used according to the invention for allocating quantizing bits in response to parameters of subband signal levels.

The allocation of the numbers of quantizing bits $B(p;m)$ in response to the set of parameters $G(p;m)$ for the second group of subbands $(13 \leq p \leq 26)$ is effected by means of an allocation window represented in FIG. 5 showing horizontally the time division and vertically the subband division indicated by their band numbers $13 \leq p \leq 26$. The duration of this allocation window corresponds with a block of 32 samples of the signal in the subband having band number $p = 13$ and since the sampling rate of this signal is $2W(p) = 2W(13)$, the duration of this allocation window is $32/[2W(13)] = 46.440$ ms. The allocation window shown in FIG. 5 is divided into blocks, each block corresponding with 32 signal samples and also with a single associated value of the characteristic parameter $G(p;m)$ and a single value of the number of quantizing bits $B(p;m)$ per signal sample, respectively. For quantizing all signal samples within the allocation window of FIG. 5 a fixed total number of B bits is required, the number of B being provided by the requirement of $B(p;m) = B(p)$ in which $B(p)$ has the value for $13 \leq p \leq 26$ given in the table of FIG. 3. The theoretical total number of bits is then $B = 3818.54$ bits, but the practical total number of bits is then no less than $B = 3836$ because the total number of quantizing bits for a block of 32 signal samples should always be an integral number.

The allocation of the numbers of quantizing bits $B(p;m)$ to the quantizers $8(p)$ and dequantizers $9(p)$ for the second subband group $(13 \leq p \leq 26)$ cannot be effected until all parameters $G(p;m)$ relating to a specific allocation window are present. In view of the structure of the allocation window of FIG. 5 this implies that for the portion $(18 \leq p \leq 26)$ of the second subband group $(13 \leq p \leq 26)$, the parameters $G(p;m)$ have to be stored temporarily and that in coder 1 a corresponding temporary storage of blocks of 32 subband signal samples $x_p(k)$ has to be effected so as to maintain in quantizers $8(p)$ and dequantizers $9(p)$ the proper time relation between a block of 32 signal samples $x_p(k)$ of block number $m$ and the parameter $G(p;m)$ of this block. Thereto coder 1 and decoder 2 comprise for each subband of this portion $(18 \leq p \leq 26)$ respective parameter buffers $20(p)$ and $21(p)$ and, furthermore, coder 1 contains an additional signal buffer $22(p)$ inserted between signal buffer $6(p)$ and quantizer $8(p)$. For simplicity, this is shown in FIG. 1 only for the subband of band number $p = 26$. The number of blocks within an allocation window for a band number $p$ then yield the duration of the temporary storage in parameter buffers $20(p)$ and $21(p)$ and in signal buffer $22(p)$. For band number $p = 26$ the allocation window contains 16 blocks and hence the temporary storage in parameter buffers $20(26)$, $21(26)$ and the signal buffer $22(26)$ should correspond with 15 blocks.

The allocation of the numbers of quantizing bits B(p;m) per signal sample from the predetermined total number of B bits for an allocation window, to the respective quantizers 8(p) and dequantizers 9(p) is effected by identical bit allocation means 23 and 24 in coder 1 and decoder 2, respectively, in response to the characteristic parameters G(p;m) within this allocation window, which together form a set of parameters {G(p;m)}. At the end of an allocation window this parameter set {G(p;m)} is available in its entirety at the outputs of the level detectors 7(p) of the second subband group (13≦p≦26) and parameter buffers 20(p), 21(p) of the above portion (18≦p≦26) of this second group.

Figure 6:
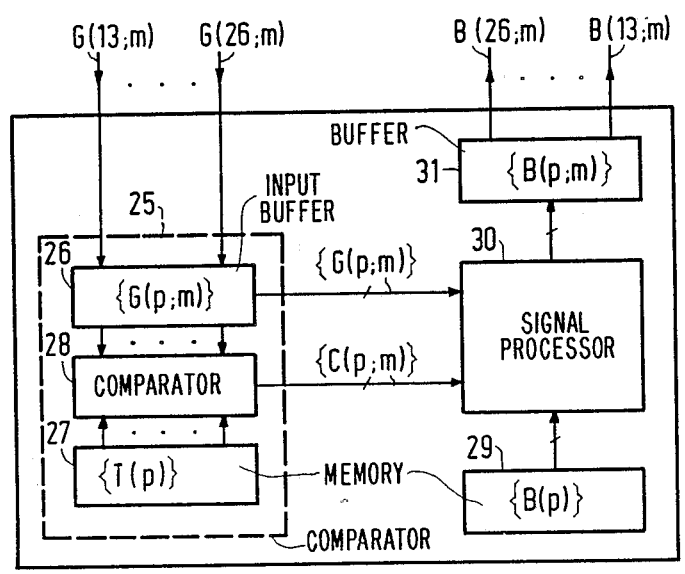
FIG. 6: shows a block diagram of bit allocation means in the system shown in FIG. 1 which are arranged in accordance with the invention.

The basic structure of the identical bit allocation means 23, 24 is represented in FIG. 6. These bit allocation means comprise comparator means 25 having an input buffer 26 for storing the set of parameters {G(p;m)} at the end of each allocation window, a memory 27 for storing a set {T(p)} of respective thresholds T(p) for the subbands of the second group (13≦p≦26), and a comparator means 28 having a separate comparator for each parameter G(p;m) of the parameter set {G(p;m)}. In a comparator parameter G(p;m) is compared to the threshold T(p) for the subband of band number p concerned and a binary comparator signal C(p;m) is generated having a first value C(p;m)="1" for G(p;m)≧T(p) and a second value C(p;m)="0" for G(p;m)<T(p). These thresholds T(p) are related to the thresholds of the human auditory system for just perceiving single tones in the respective frequency ranges, more specifically such that for a representative value of the sound pressure level of single tones, for example a value of 60dB SPL, the threshold T(p) forms a perceptually acceptable approximation of the threshold of the human auditory system in the frequency range of the subband of band number p.

In this manner the comparator means 25 divide the blocks (p;m) of subband signal $x_p(k)$ within an allocation window into blocks (p;m) containing perceptually significant signal energy on the basis of the criterion G(p;m)≦T(p) and thus having a value of C(p;m)="1", and blocks (p;m) containing no perceptually significant signal energy on the basis of the criterion G(p;m)<T(p) and thus having a value of C(p;m)="0". In accordance with the invention no quantizing bits are allocated to the blocks (p;m) having C(p;m)="0" and the quantizing bits saved thus are used for the finer quantization of the blocks (p;m) within the same allocation window having C(p;m)="1". The bit allocation means shown in FIG. 6 thereto comprise a memory 29 for storing a predetermined allocation pattern {B(p)} of numbers of B(p) quantizing bits per signal sample for the second group of subbands (13≦p≦26), which numbers B(p) are related to the noise-masking curve of the human auditory system in the manner already extensively described; in the present embodiment these numbers B(p) have the same values $B(p) = \log_2[L(p)]$ as shown in the table of FIG. 3 for 13≦p≦26. The bit allocation means shown in FIG. 6 further include a signal processor 30 which determines an allocation pattern {B(p;m)} of numbers of B(p;m) quantizing bits per signal sample for the blocks (p;m) of subband signals $x_p(k)$ within the allocation window concerned in response to the predetermined allocation pattern {B(p)} in memory 29, the parameter set {G(p;m)} in input buffer 26 and the associated set {C(p;m)} of binary comparator signals at the output of comparator means 28. If all blocks (p;m) contain perceptually significant signal energy and, consequently, for each element of the set {C(p;m)} it holds that C(p;m)="1", the allocation pattern {B(p;m)} at the output of signal processor 30 is equal to the predetermined allocation pattern {B(p)} stored in memory 29. This is the case in nearly all passages of rather all kinds of music signals. However, during passages presenting single tones no more than a few blocks (p;m) of an allocation window contain perceptually significant signal energy, whereas the remaining blocks (p;m) contain no perceptibly significant signal energy and thus have a value of C(p;m)="0". Now signal processor 30 does not allocate quantizing bits to blocks (p;m) having C(p;m)="0" and thus for these blocks (p;m) it holds that B(p;m)="0". Since a fixed total number of B bits is predetermined for quantizing all signal samples within the allocation window, a number of quantizing bits is saved in this manner. Signal processor 30 determines the sum S of the saved numbers of quantizing bits, the contribution of a block (p;m) having C(p;m)="0" to this sum S being equal to the number of M.B. (p) bits available for the quantizing of the M=32 signal samples of this block (p;m) by a number of B(p) quantizing bits per sample according to the predetermined allocation pattern {B(p)} which is stored in memory 29. This sum S of saved numbers of bits is then allocated to the blocks (p;m) within the allocation window having C(p;m)="1" for obtaining numbers of B(p;m)=B'(p) quantizing bits per signal sample which exceed the numbers B(p;m)=B(p) with B(p) according to the predetermined allocation pattern {B(p)}. This allocation commences at the block (p;m) having the largest value of parameter G(p;m) and a number of B(p;m)=B'(p) quantizing bits is allocated to this block (p;m) if the number of bits ΔS=M[B'(p)-B(p)] required for increasing the number of quantizing bits is actually available, that is to say, if ΔS≦S. If the latter is true, the sum S is reduced by this number ΔS and the number of B(p;m)=B'(p) quantizing bits is allocated to the block (p;m) having the largest value G(p;m). This process of allocation is then repeated, it being preferred to lower the parameter G(p;m) of the block (p;m) to which additional quantizing bits have been allocated, in order to evenly distribute the sum S of the saved numbers of bits over the blocks (p;m) having C(p;m)="1". This allocation process stops when the number of remaining bits, after allocating an additional number of quantizing bits to a specific block (p;m), is no longer sufficient for a next allocation of additional quantizing bits to whatever block (p;m) having C(p;m)="1" within the allocation window, or when a predetermined maximum number of quantizing bits per signal sample has been allocated to all blocks (p;m) having C(p;m)="1" within the allocation window. In the present embodiment of the set of "enlarged" numbers B'(p) is formed from the values of $B(p)=\log_2[L(p)]$ in the Table of FIG. 3 by omitting the lowest value of $B(p)=\log_2(3)$ and adding an additional value of $B'(p)=\log_2(33)$ as a maximum number of quantizing bits per signal sample. The reason for this choice will be further explained hereinafter.

The allocation pattern {B(p;m)} thus determined in signal processor 30 is transferred to an output buffer 31 at the end of each allocation window. Subsequently, this output buffer 31 transfers the respective numbers of B(p;m) quantizing bits per signal sample to the quantizers 8(p) in coder 1 and the dequantizers 9(p) in decoder 2, respectively, this transfer being effected in accordance with the time positions of the respective blocks (p;m) in the allocation window as shown in FIG. 5, so that the correct time relation between a block (p;m) of M=32 signal samples and the number of B(p;m) quantizing bits per sample of this block (p;m) is maintained.

The measures described hereinbefore result in an effective reduction of the audibility of quantizing noise during music passages presenting single tones. This can be illustrated in a simple manner by reverting to the description of FIG. 4, with reference to which it was explained how the quantizing noise sometimes becomes audible during suchlike single tone music passages. In the circumstances considered there, the measures according to the invention result in that the number of B'(p) quantizing bits per signal sample exceeds the original number of B(p) and hence the number of L'(p) quantizing levels also exceeds the original number of L(p). This implies that the energy N' of the quantizing noise of now lower by an amount of approximately $$20 \log_{10}[L'(p)/L(p)]dB$$

than the original energy value N represented in FIG. 4, due to which the shaded portion of the quantizing noise above the curve of the threshold in FIG. 4, that is to say the audible portion of the quantizing noise, becomes considerably smaller or even completely disappears. This effective reduction of the audibility of quantizing noise, however, is not accompanied by an increase of the average number of quantizing bits per sample of the quantized signals at the output of coder 1 and input of decoder 2, respectively, in FIG. 1, because the predetermined total number of B bits for quantizing all signal samples within the allocation window of FIG. 5 is not changed by the measures according to the invention, as they exclusively effect a reallocation of this predetermined total number of B bits to the blocks (p;m) within this allocation window. Extensive listening tests with a wide range of music signals have shown that due to these measures substantially no quantizing noise during music passages presenting single tones is audible any longer.

Figure 7:
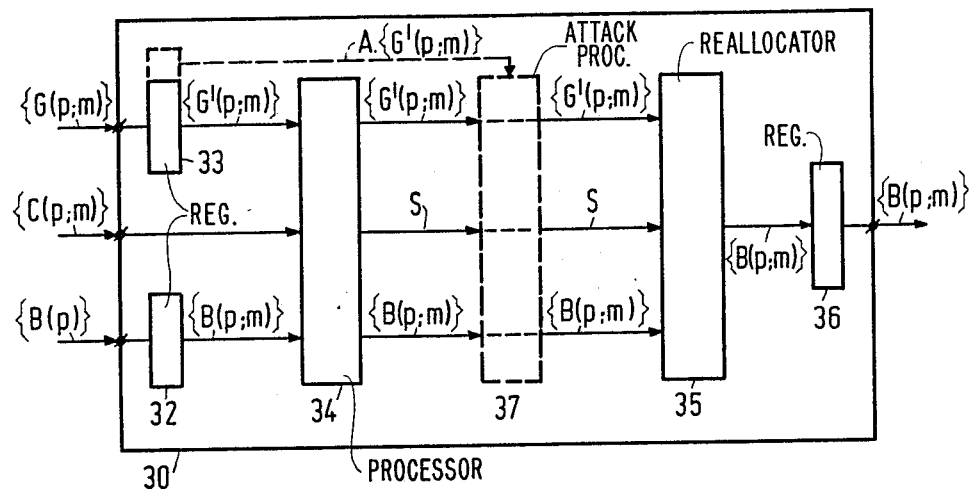
FIG. 7: shows a block diagram of a signal processor which can be used in the bit allocation means shown in FIG. 6.

Within the scope of the invention the reallocation of the fixed total number of B bits to the blocks (p;m) within the allocation window can be realized in many different ways resulting in a great variety of possible implementations of the bit allocation means shown in FIG. 6, especially respecting to the signal processor 30. FIG. 7 shows a block diagram of an example of a signal processor 30 that can be utilized for achieving an example of this reallocation which will be explained with reference to the flow charts represented in FIG. 8 and FIG. 9.

Figure 8:
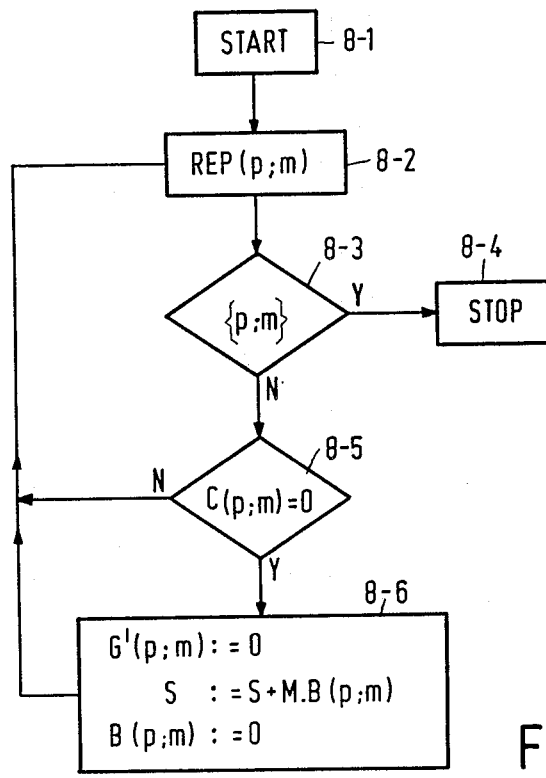
FIG. 8 and FIG. 9: show flow charts of a possible program routine for a module of the signal processor shown in FIG. 7.

The signal processor 30 shown in FIG. 7 contains an input register 32 into which the predetermined allocation pattern {B(p)} is loaded as a default value for the allocation pattern to be determined {B(p;m)}, as well as an input register 33 into which the parameter set {G(p;m)} is loaded as the initial value of a set of needs {G'(p;m)}, whose elements represent the need of quantizing bits for the blocks (p;m) during the reallocation process. The signal processor 30 further includes a first module 34 which allocates the value of B(p;m)=0 to the blocks (p;m) with C(p;m)="0", determines the sum S of the numbers of M.B(p;m)=M.B(p) of quantizing bits available for these blocks (p;m), and sets of zero the need of bits G'(p;m) of these blocks (p;m), so as to indicate by the value of G'(p;m)=0 their being barred from the reallocation of the sum S of "saved" numbers of bits, this module 34 being responsive to the set {C(p;m)} of binary comparator signals at the output of comparator means 28 of FIG. 6 and to the sets {B(p;m)}={B(p)} and {G'(p;m)}={G(p;m)} at the outputs of registers 32 and 33 of FIG. 7. FIG. 8 shows a flow chart of an optical program routine for this first module 34. The various blocks in the flow chart have the following meanings:

| Block | Titel | Meaning |
|---|---|---|
| 8-1 | START | start of routine which is repeated for each allocation window |
| 8-2 | REP(p;m) | repeat for all blocks (p;m) of the allocation window |
| 8-3 | (p;m) | test whether all blocks (p;m) of the allocation window have been processed |
| 8-4 | STOP | end of routine |
| 8-5 | C(p;m)=0 | test whether C(p;m) has the value "0" |
| 8-6 | G'(p;m):=0 S: =S+M.B(p;m) | set the need of bits G'(p;m) to zero increment sum S with the available number of M.B(p;m)=M.B(p) bits |
| | B(p;m):=0 | do not allocate quantizing bits to block (p;m) so that B(p;m)=0. |

Figure 9:
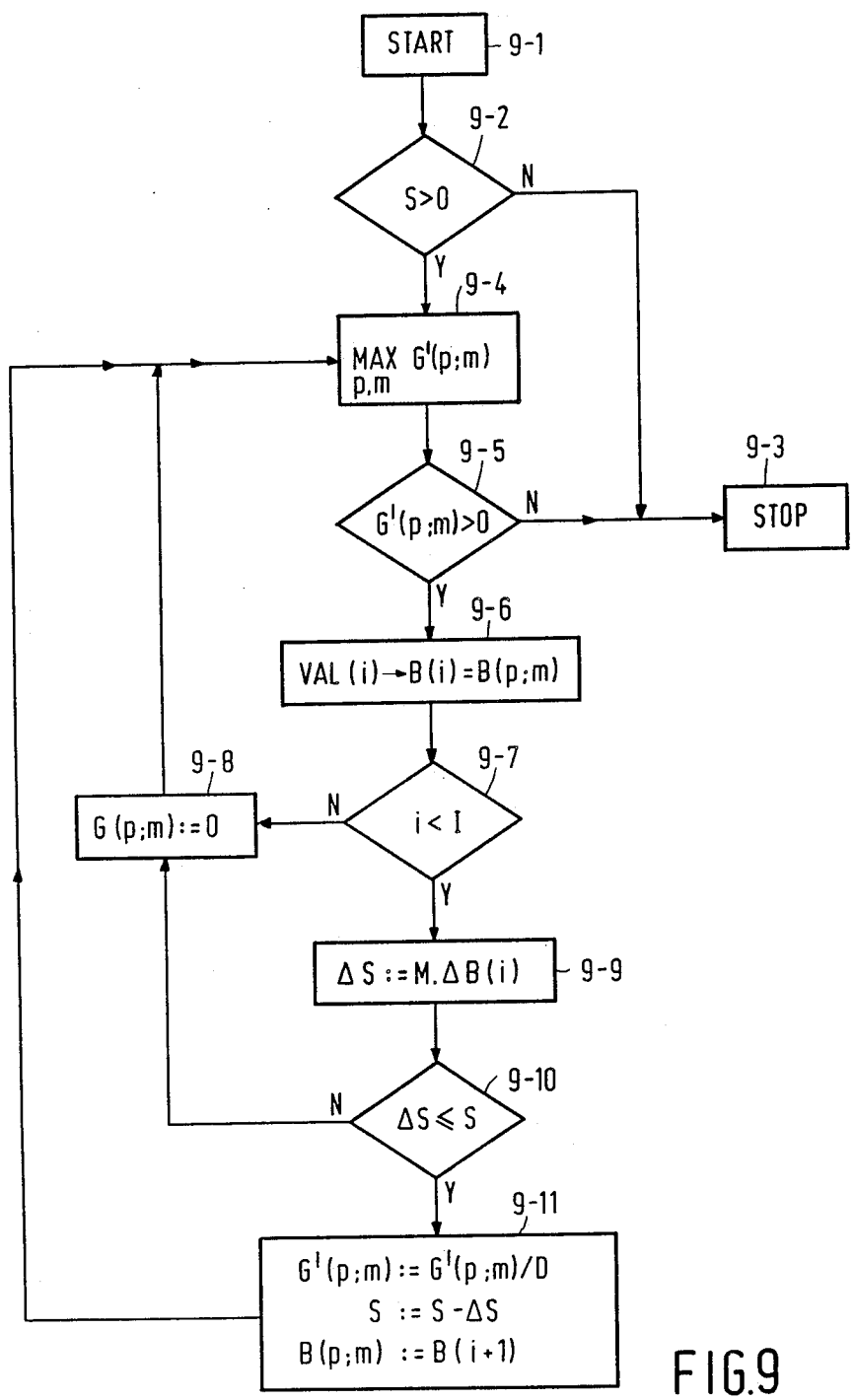
Figures 10, 12:
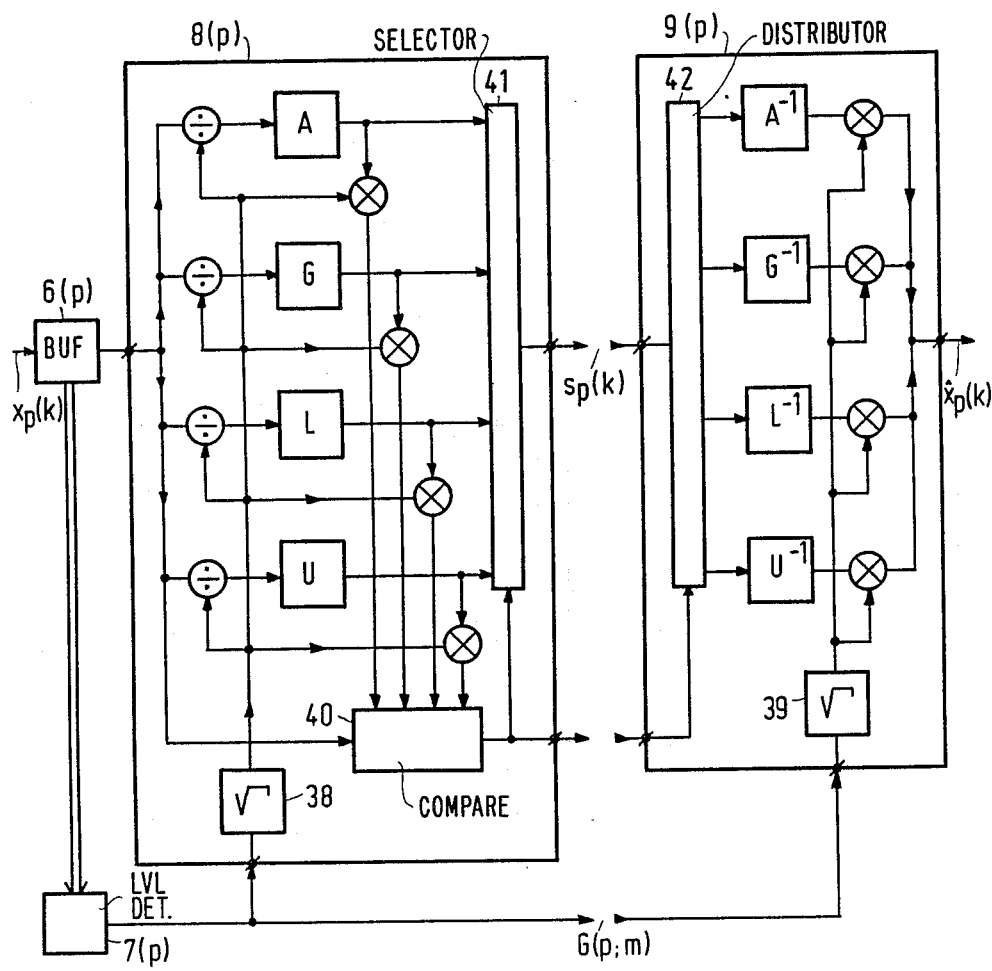
FIG. 10: shows a table of data relating to a ranking of quantizing options used in the flow chart shown in FIG. 9.
FIG. 12: shows a block diagram of a quantizer and an associated dequantizer for a subband, in which us is made of a quantization optimized for probability density functions.

The signal processor 30 shown in FIG. 7 comprises a second module 35 for reallocating the sum S of saved numbers of quantizing bits to blocks (p;m) having C(p;m)="1". Reallocating this sum S formed in module 34 is effected in response to the sets {B(p;m)} and {G'(p;m)} also formed in module 34, the blocks (p;m) having C(p;m)="0" being barred from reallocation on account of the value of G'(p;m)="0" of their need of bits and the value B(p;m)="0" being the final value for these blocks (p;m) in the allocation pattern B(p;m) at the output of signal processor 30. FIG. 9 shows a flow chart of an optical program routine for this reallocation in module 35, use being made of the fact that the different quantizing options can be arranged in a simple manner from coarse to fine and in this order be provided with a number i with i=1,2, . . . , I. FIG. 10 shows a table of data relating to this arrangement for the present embodiment, for which the number of quantizing options is I=8. In this table the first column shows the number i, the second column the number of L(i) quantizing levels, the third column the number of B(i) quantizing bits per signal sample and the fourth column the number of ΔB(i) quantizing bits per signal sample required to increment B(i) to B(i+1), so that B(i)+ΔB(i) is equal to B(i+1) and the corresponding increment for a block of M signal samples thus requires a number of ΔS=M.ΔB(i) quantizing bits. The values of the numbers B(i) and ΔB(i) in the Table are rounded to two decimal figures.

The various blocks in the flow chart of FIG. 9 have the following meanings:

| Block | Title | Meaning |
|---|---|---|
| 9-1 | START | start of routine which is repeated for each allocation window |
| 9-2 | S > 0 | test whether sum S exceeds zero |
| 9-3 | STOP | end of routine |
| 9-4 | MAX {G'(p;m)} p,m | determine block (p;m) of the allocation window having the greatest need of bits G'(p;m) |
| 9-5 | G'(p;m)>0 | test whether the need of bits G'(p;m) exceeds zero |
| 9-6 | VAL(i)−>B(i)=B(p;m) | determine number i for block (p;m) so that B(i)=B(p;m) |
| 9-7 | i < I | test whether number i is |

| Block | Title | Meaning |
|---|---|---|
| 9-8 | G'(p;m):= 0 | smaller than I set the need of bits G'(p;m) to zero |
| 9-9 | ΔS:=M.ΔB(i) | assign the value M.ΔB(i) to the sum change ΔS |
| 9-10 | ΔS≦S | test whether the sum change ΔS does not exceed the sum S. |
| 9-11 | G'(p;m):= G'(p;m)/D | assign a value G'(p;m)/D with D>1 to the need of bits G'(p;m) |
|  | S:=S−ΔS | decrement the sum S with the number of bits of sum change ΔS=M.ΔB(i) |
|  | B(p;m):=B(i+1) | allocate a number of B(i+1) quantizing bits per sample to block (p;m). |

After the start of the routine it is tested whether quantizing bits have really been saved (conditional block 9-2). If they have not, the routine stops and an allocation pattern {B(p;m)} equal to the default pattern {B(p)} is passed on to an output register 36 of signal processor 30 in FIG. 7 (operational block 9-3). If they have, the block (p;m) of the allocation window having the greatest need of bits G'(p;m) is determined (operational block 9-4). Subsequently, it is tested whether this need of bits G'(p;m) exceeds zero (conditional block 9-5), and if it does the present number of B(p;m) quantizing bits per signal sample is identified by a number i in an arrangement according to the table of FIG. 10 so that B(i)=B(p;m) (operational block 9-6). Subsequently, it is tested whether the maximum number of quantizing bits per signal sample has been allocated to block (p;m), by testing whether the number i is smaller than the highest number I (conditional block 9-7). If it is not, thus i=I, block (p;m) is barred from further reallocation by setting its need of bits G'(p;m) to zero (operational block 9-8). If it is, thus i<I, the number of ΔS=M.ΔB(i) quantizing bits needed to increment the number of quantizing bits per sample from the present value B(i) to the next higher value B(i+1) for the M signal samples of block (p;m) is determined, and subsequently it is tested whether this number ΔS is actually available (operational block 9-9 and conditional block 9-10). If the latter is not the case and thus the sum change ΔS exceeds the sum S, the actual number of quantizing bits available for reallocation, block (p;m) is barred from further reallocation by setting its need of bits G'(p;m) to zero (operational block 9-8). If, on the other hand, the number of ΔS quantizing bits required for an increment is available indeed, the sum S is decremented with this number ΔS and the next value B(i+1) is assigned to the number of B(p;m) quantizing bits per sample of this block (p;m) (operational block 9-11). The need of bits G'(p;m) of this block (p;m) is likewise reduced by assigning thereto a value of G'(p;m)/D, with D>1, so as to evenly distribute the numbers of quantizing bits saved in all (the initial value of the sum S) over the blocks (p;m) of the allocation window having a value of C(p;m)="1". Thereto, the value D can be determined such that the improvement in the signal-to-noise ratio due to the increment of the number of quantizing bits per signal sample with an amount of ΔB(i) is approximately reflected in the reduction of the need of bits G'(p;m). In the present embodiment this improvement is approximately 3dB for i=2,3,...7 and approximately 6dB for i=1 so that one fixed value D will suffice. In this case D has a value of D=$\sqrt{2}$ if characteristic parameter G(p;m), and thus also the parameter of the need of bits G'(p;m), represents the peak value of the amplitude of the signal samples in block (p;m), and a value of D=2 if G(p;m) and thus also G'(p;m), represents the average value of the power of the signal samples in this block (p;m). After these operations have been carried out with respect to the sum S, the number of quantizing bits per signal sample B(p;m) and the need of bits G'(p;m) (operational block 9-11), the routine returns to determine the block (p;m) of the allocation window now have the greatest need of bits G'(p;m) (operational block 9-4). The routine stops if all blocks (p;m) of an allocation window have a need of bits G'(p;m)=0 and the allocation pattern {B(p;m)} determined then is transferred on to the output register 36 of signal processor 30 shown in FIG. 7 (conditional block 9-5 and operational block 9-3).

After the routine has been ended the remaining sum S of "saved" numbers of quantizing bits can exceed zero. For quantizing and dequantizing the subband signals of the second group (13≦p≦26), however, a fixed total number of B bits per allocation window is predetermined. An remaining "saved" quantizing bits after the end of the routine can be used as filler bits without information content in the output signals of coder 1, so as to provide the overall bit capacity required for the representation of these output signals with a constant value in view of the transmission via and/or the storage in medium 4. As the reallocation described of the fixed total number of B bits to the blocks (p;m) is effected in an identical manner within an allocation window in coder 1 and decoder 2 in response to the parameter set {G(p;m)}, present in both coder 1 and decoder 2, the presence, if any, of filler bits in the output signals of coder 1 need not be marked.

With respect to the program routine described above it should again be observed that this routine is given merely by way of example and that other, more efficient, routines can be designed by those skilled in the art without leaving the scope of the invention. However, the example described hereinbefore is advantageous in its clear structure and simple criterion (conditional block 9-5) for terminating the program routine for reallocation.

As already stated before, extensive listening tests with widely varying music signals have proved that owing to the measures according to the invention the quantizing noise is generally no longer audible during music passages presenting single tones. The cases in which audible quantizing noise only occurs sporadically appear to relate predominantly to music passages having strong attacks of the music signal, in which in practically all subbands the signal energy suddenly changes considerably. In a preferred embodiment of the present subband coding system also the audibility of quantizing noise during music passages with strong attacks can be reduced effectively. Thereto, the bit allocation means 23, 24 in coder 1 and decoder 2 of FIG. 1 can also include means which are operative in response to successive characteristic parameters G(p;m) and G(p;m+1) of each subband of the second group (13≦p≦26) in two events:

if the ratio Q=G(p;m)/G(p;m+1) falls short of a predetermined value 1/R(p) with R(p) of the order of $10^2$ and if block (p;m) is situated within the allocation window, no quantizing bits are allocated to block (p;m) and the numbers of B(p;m) quantizing bits per signal sample available for this block are added to the said sum S of saved numbers of quantizing bits; this happens at the start of a strong attack.

if the ratio $Q=G(p;m)/G(p;m+1)$ exceeds the value of R(p) and if block (p;m+1) is situated within the allocation window, no quantizing bits are allocated to block (p;m+1) and the numbers of B(p;m+1) quantizing bits per signal sample available for this block are added to the said sum S of saved numbers of quantizing bits; this happens at the end of a strong attack.

These measures exploit the psychoacoustic effect of temporal masking, that is to say the property of the human auditory system that its threshold for perceiving signals shortly before and shortly after the occurrence of another signal having a relatively high signal energy appears to be temporarily higher than during the absence of the latter signal. By not allocating quantizing bits to blocks of the allocation window which occur shortly before and shortly after blocks having a relatively high signal energy, the numbers of quantizing bits saved thus can be used for a finer quantizing of these blocks having a relatively high signal energy, so that the quantizing noise during the latter blocks is reduced, whereas the non-allocation of quantizing bits to blocks having a relatively low signal energy does not result in audible distortion anyhow owing to the temporal masking of the human auditory system.

In the exemplary embodiment of a signal processor 30 for the bit allocation means 23, 24 which is described with reference to FIG. 7, the aforementioned measures can be implemented in a simple manner by inserting a third module 37 between the first and second modules 34, 35 already present and by adding to input register 33 a section to which for each subband of the second group ($13 \leq p \leq 26$) the parameter G(p;m) of the last block (p;m) of the previous allocation window (thus in FIG. 5 the rightmost block for each subband) is transferred when the parameter set {G(p;m)} of the present allocation window is loaded into the register proper 33. The parameters of the previous allocation window which are transferred in this manner to this additional section of register 33 form an addition A{G'(p;m)} to the set of needs {G'(p;m)} of the present allocation window at the output of module 34. This addition A{G'(p;m)} is used in module 37 for performing operations the sum S and the set {G'(p;m)} and B{(p;m)} formed in module 34 for the present allocation window, these operations in module 37 having the same nature as those in module 34 because the value of B(p;m)=0 is assigned to specific blocks (p;m) of the present allocation window, the sum S of the saved numbers of quantizing bits is incremented with the available numbers of M.B(p;m) quantizing bits for these blocks (p;m), and the need of bits G'(p;m) of these blocks (p;m) is set to zero so as to show by the value of G'(p;m) that they have been barred from reallocation of the incremeted sum S effected in module 35. As regards the available numbers of M.B(p;m) quantizing bits it holds that these numbers have a value of M.B(p;m)=M.B(p), unless no quantizing bits have been allocated to the block (p;m) in module 34 and thus B(p;m)=0 for this block. In module 37, use is made of an "augmented" allocation window having bit needs from the set of needs {G'(p;m)} of the proper allocation window and the addition A{G'(p;m)} of the "last" blocks of the previous allocation window. Thereby it is avoided that the transition from one allocation window to the next allocation window prevents the use of temporal masking for the portion of ($13 \leq p \leq 17$) of the second group of subbands ($13 \leq p \leq 26$), and interrupts this masking for the remaining portion ($18 \leq p \leq 26$) of this second group, at least as regards temporal post-masking (which stretches out over a considerably larger time interval than the pre-masking, see FIG. 4 in the above article by Krasner).

Figure 11:
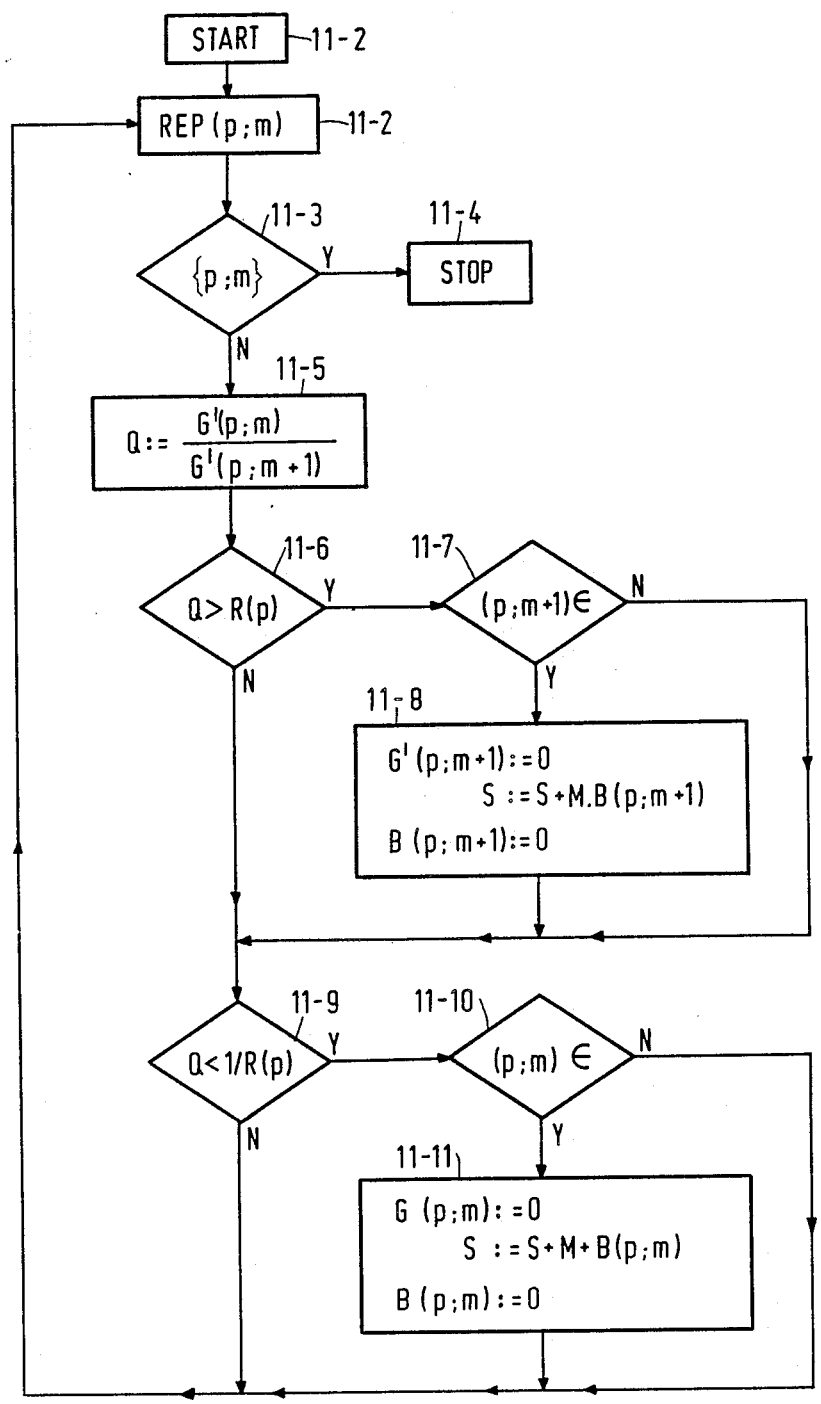
FIG. 11: shows a flow chart of an optional program routine for an additional module of the signal processor shown in FIG. 7 which can be utilized in a preferred embodiment for the subband coding according to the invention.

FIG. 11 shows a flow chart of an optical program routine for this module 37 of FIG. 7. The various blocks in the flow chart have the following means:

| Block | Title | Meaning |
|---|---|---|
| 11-1 | START | start of the routine which is repeated for allocation window |
| 11-2 | REP(p;m) | repeat for all pairs of successive blocks (p;m) and (p;m+1) of the "augmented" allocation window |
| 11-3 | (p;m) | test whether all pairs of successive blocks (p;m) and (p;m+1) of the "augmented" allocation window have been processed |
| 11-4 | STOP | end of routine |
| 11-5 | $Q := \frac{G'(p;m)}{G'(p;m+1)}$ | assign a value of G'(p;m)/G'(p;m+1) to Q |
| 11-6 | $Q \geq R(p)$ | test whether Q exceeds R(p) |
| 11-7 | (p;m+1) | test whether block (p;m+1) is situated within the allocation window proper |
| 11-8 | G'(p;m+1):=0 | set need of bits G'(p;m + 1) to zero |
| | S:=S+M.B(p;m+1) | increment sum S with available number of M.B(p;m+1) bits |
| | B(p;m+1):=0 | do not allocate quantizing bits to block (p;m+1) so that B(p;m+1)=0 |
| 11-9 | Q<1/R(p) | test whether Q is smaller than 1/R(p) |
| 11-10 | (p;m)ϵ | test whether block (p;m) is situated within the allocation window proper |
| 11-11 | G'(p;m):=0 | set need of bits G'(p;m) to zero |
| | S:=S+M.B(p;m) | increment sum S with available number of M.B(p;m) bits |
| | B(p;m):=0 | do not allocate quantizing bits to block (p;m) so that B(p;m)=0. |

The routine described above is so simple that a further explanation can be dispensed with after reading the extensive explanation of the functions and operations in module 37. With respect to the predetermined value R(p) it should be observed that an equal value for all subbands of the second group ($13 \leq p \leq 26$) will suffice, and that this value corresponds with a change of the order of 20dB the average signal, over one block of the power of the signal samples. Also with respect to this routine it is observed that other and more efficient routines can be designed by those skilled in the art without leaving the scope of the invention.

Suchlike improvements of the system for subband coding of music signals described so far are also feasible in other respects. A first example of such an improvement relates to the arrangement of the dequantizers 9(p) for the subbands of the second group ($13 \leq p \leq 26$). If no quantizing bits are allocated to these dequantizers 9(p) during specific blocks (p;m), the output signals $\hat{x}_p(k)$ have a signal level of zero during these blocks (p;m), whereas the associated characteristic parameter G(p;m) is situated below the threshold T(p), true enough, but can still differ from zero. In the dequantizers 9(p) a digital noise source can be incorporated applying to the output a signal having a signal level corresponding with a characteristic parameter G(p;m) only when there are blocks (p;m) without quantizing bits, thus having a value of B(p;m)=0. The occurrence of specific sudden changes in the levels of the output signals $\hat{x}_p(k)$ of dequantizers 9(p), which do not have equivalents in the input signals $x_p(k)$ of quantizers 8(p), is avoided by this simple measure.

A second example of such an improvement also relates to the arrangement of the quantizers 8(p) and dequantizers 9(p). The waveform of a subband signal $x_p(k)$ can have different probability density functions and the quantizers, as is known, can be optimized for a given probability density function (see the sections 4.3.2 and 4.4.1 of the chapter "Quantization" in the aforementioned book by Jayant and Noll, pp 125-127 and pp. 131-135). Basically, it is possible in the coder 1 to determine the time-varying probability density functions for the subband signals $x_p(k)$ and to always adjust the quantizers 8(p) such that they are optimal for the probability density functions found thus, but in practice this possibility is not very attractive because also the bit capacity for the quantized output signals of coder 1 has to be enlarged considerably to be able to realize the corresponding optimal adjustment of the dequantizers 9(p) in decoder 2—disregarding the considerably increased complexity of coder 1 required thereto. With reference to the block diagram of FIG. 12 it will now be illustrated how quantizing optimized for probability density functions can be used in a relatively simple manner, the required bit capacity for the quantized output signals of coder 1 only being subjected to a slight increase. Corresponding elements in FIG. 1 and FIG. 12 are denoted by the same references.

In FIG. 12 the quantizer 8(p) for subband signal $x_p(k)$ comprises four fixed quantizers optimized for four different types of probability density functions: quantizer U for the Uniform type, quantizer L for the Laplace type (also known as the two-sided exponential type), quantizer G for the Gauss type (also known as the Normal type), and quantizer A for the Arcsinus type (the probability density function for the amplitude of a sinusoid waveform). Dequantizer 9(p) also comprises the four corresponding dequantizers denoted $U^{-1}$, $L^{-1}$, $G^{-1}$ and $A^{-1}$. These four types of probability density functions are of common knowledge, as are the associated quantizers (see section 2.2.2 of the chapter "Waveform Characterization" in the aforementioned book by Jayant and Noll, pp. 31-34, and the above sections 4.3.2. and 4.4.1 of the chapter entitled "Quantization"). The selection of these four types is based on measurements, which have proved that in substantially all cases the real probability density function for a subband signal $x_p(k)$ can be modelled as one of these four types. In order to keep the quantizing errors smallest possible, a block (p;m) of a subband signal $x_p(k)$ is quantized with the aid of the four quantizers U, L, G and A and subsequently, the quantizer producing the smallest quantizing error is selected. Since the FIG. 12 fixed quantizers and corresponding fixed dequantizers are used, the adaptation of the quantizing characteristic to the signal level in a block (p;m) should be effected by an operation on the signal samples of this block (p;m) at the input of each quantizer U, L, G, A, and by a corresponding inverse operation on the signal samples of this block (p;m) at the output of each dequantizers $U^{-1}$, $L^{-1}$, $G^{-1}$, $A^{-1}$. In FIG. 12 is shown how this adaptation is effected in the case when parameter G(p;m) represents the power of the signal samples averaged over a block (p;m) and the fixed quantizers and dequantizers are so-called unit variance quantizers and dequantizers (that is to say, designed for signals having a variance equal to one). In this case an equivalent amplitude parameter $\sqrt{G(p;m)}$ is derived from the power parameter G(p;m) determined in the level detector 7(p) by means of circuits 38 and 39. The operation at the input of each quantizer U, L, G, A is then a division of the amplitude of the signal samples by this parameter $\sqrt{G(p;m)}$ and the inverse operation at the output of each dequantizer $U^{-1}$, $L^{-1}$, $G^{-1}$, $A^{-1}$ a multiplication of the amplitude of the signal samples by this parameter $\sqrt{G(p;m)}$. In view of the selection of the quantizer, in FIG. 12 the output signal of each of the quantizers U, L, G and A, after being multiplied by the relevant parameter $\sqrt{G(p;m)}$ is applied to a circuit 40 for determining the mean square value of the difference between this output signal and the original subband signal $x_p(k)$, averaged over a block (p;m). Subsequently, in circuit 40 it is determined which of these four mean square difference values is the least, and the quantizer concerned is indicated by a two-bit index. Circuit 40 applies this index as a selection signal to a selector 41 to which the outputs of the quantizers U, L, G and A are connected. Since circuit 40 cannot determine the index until all M=32 signal samples of a block (p;m) have been processed, selector 41 also comprises an input buffer for the temporary storage of each of the signals applied thereto, for the duration of a block (p;m) of M signal samples. Then the index determined in circuit 40 is also used as a selection signal for a distributor 42 in dequantizer 9(p) to which the inputs of the dequantizers $U^{-1}$, $L^{-1}$, $G^{-1}$ and $A^{-1}$ are connected. The quantized subband signal $s_p(k)$ at the output of selector 41, originating from one of the four quantizers U, L, G and A is thus exclusively applied to the dequantizer ($U^{-1}$, $L^{-1}$, $G^{-1}$ or $A^{-1}$) which corresponds with the selected quantizer U, L, G or A). The above selection on the basis of the least mean square quantizing error for a block (p;m) of M=32 signal samples results in an improvement of the quality of the dequantized subband signal $\hat{x}_p(k)$. The increase of the bit capacity for the output signals of coder 1 in FIG. 1 required for this improvement, amounts to not more than 2 bits per block (p;m) of M=32 signal samples for each subband signal $x_p(k)$. It has already been stated before that in the chosen embodiment a bit capacity of 98.225 kbits/s is required for all subband signals $x_p(k)$, and a bit capacity of 11.025 kbits/s for all characteristic parameters G(p;m) each being quantized by 8 bits per block of M=32 signal samples. For all indices, each requiring 2 bits per block of M=32 signal samples, an additional bit capacity of 2.756 kbits/s will then be required. The overall bit capacity required for representing all output signals of the coder 1 in FIG. 1 thus rises from a value of 109.250 kbits/s to a value of 112.006 kbits/s, and the average number of bits per bit sample in this representation thus rises from a value of 2.477 bits per sample to a value of 2.540 bits per sample. The increase of the bit capacity and average number of bits per sample, respectively, required for this improvement thus amounts to approximately 2.5% only.

What is claimed is:

1. A digital system including a coder and a decoder for subband coding of a digital audio music signal having a given sampling rate 1/T, the coder comprising:
analysis filter means responsive to the audio music signal for generating a number of P subband signals, the analysis filter means dividing the audio music signal band according to the quadrature mirror filter technique, with sampling rate reduction into successive subbands of band numbers p ($i \leq p \leq P$) increasing with the frequency, the bandwidth and the sampling rate for each subband being an integral submultiple of 1/(2T) and 1/T, respectively, and the bandwidths of the subbands approximately corresponding with the critical bandwidths of the human auditory system in the respective frequency ranges, means responsive to each of the subband signals for determining a characteristic parameter G(p;m) which is representative of the signal level in a block having a same number of M signal samples for each subband, m being the number of the block, means for adaptively quantizing the blocks of the respective subband signals in response to the respective characteristic parameters G(p;m);

and the decoder comprising:

means for adaptively dequantizing the blocks of quantized subband signals in response to the respective characteristic parameters G(p;m), synthesis filter responsive to the dequantized subband signals means for constructing a replica of the digital audio music signal; these synthesis filter means merging the subbands to the audio music signal band according to the quadrature mirror filter technique, with the sampling rate increase, characterized in that the respective quantizing means in the coder and the respective dequantizing means in the decoder for each of the subbands having a band number p smaller than $p_{im}$ are arranged for the respective quantizing and dequantizing of the subband signals with a fixed number of B(p) bits, the subband having band number $p_{im}$ being situated in the portion of the audio music signal band with the lowest thresholds for masking noise in critical bands of the human auditory system by single music tones in the centre of the respective critical bands, the coder and the decoder each further include bit allocation means responsive to the respective characteristic parameter G(p;m) of the subbands having a band number p not smaller than $p_{im}$ within an allocation window having a duration equal to the block length for the subband having the band number $p_{im}$, for allocating a number of B(p;m) bits from a predetermined fixed total number of B bits for the allocation window to the respective quantizing means in the coder and the respective dequantizing means in the decoder for the signal block having block number m of the subband having band number p, the bit allocation means each comprising:

comparator means for comparing within each allocation window the characteristic parameters G(p;m) to respective thresholds T(p) for the subbands having band number p and for generating respective binary comparator signals C(p;m) having a first value C(p;m)="1" for a parameter G(p;m) not smaller than the threshold T(p) and a second value C(p;m)="0" in the opposite case, these thresholds T(p) being related to the thresholds of the human auditory system for just perceiving single music tones, means for storing a predetermined allocation pattern {B(p)} of numbers of B(p) quantizing bits for subbands having respective band numbers p, these numbers B(p) being related to the thresholds for masking noise in the critical bands of the human auditory system by single music tones in the centre of the respective critical bands, means for determining an allocation pattern {B(p;m)} of respective numbers of B(p;m) quantizing bits for the signal block having the block number m of the subband having band number p, in response to the allocation pattern stored {B(p)} and the respective characteristic parameters G(p;m) and comparator signals C(p;m), the allocation pattern {B(p;m)} being equal to the allocation pattern stored {B(p)} if all comparator signals C(p;m) within an allocation window have the said first value C(p;m)="1" and, in the opposite case, the allocation pattern {B(p;m)} being formed by not allocating quantizing bits to blocks within an allocation window having a comparator signal of the said second value C(p;m)="0" and by allocating the sum S of the numbers of B(p) quantizing bits available within an allocation window for the latter blocks in the allocation pattern stored {B(p)} to the blocks within an allocation window having a comparator signal of the said first value C(p;m)="1" and having the largest values of the characteristic parameter G(p;m) for obtaining numbers of B(p;m) quantizing bits which are greater than the corresponding numbers of B(p) quantizing bits in the allocation pattern stored {B(p)}, means for supplying the allocation pattern {B(p;m)} determined thus to the respective quantizing means in the coder and the respective dequantizing means in the decoder.

2. A digital system as claimed in claim 1, characterized in that the said bit allocation means also include means which in response to successive characteristic parameters G(p;m) and G(p;m+1) of each subband of band number p exceeding $p_{im}$:

do not allocate quantizing bits to block (p;m+1) and add the numbers of B(p;m+1) quantizing bits available for this block to the said sum S, if the ratio Q=G(p;m)/G(p;m+1) is greater than a predetermined value R(p) of the order of $10^2$ and block (p;m+1) is situated within the allocation window;

do not allocate quantizing bits to block (p;m) and add the numbers of B(p;m) quantizing bits available for this block to the said sum S, if the ratio Q=G(p;m)/G(p;m+1) is smaller than the value 1/R(p) and block (p;m) is situated within the allocation window.

3. A coder for subband coding for a digital audio music signal having a given sampling rate 1/T, the coder comprising:

(a) analysis filter means responsive to the audio music signal for generating a number of P subband signals, the analysis filter means dividing the audio music signal band according to the quadrature mirror filter technique, with sampling rate reduction into successive subbands of band numbers p ($i \leq p \leq P$) increasing with the frequency, the bandwidth and the sampling rate for each subband being an integral submultiple of 1/(2T) and 1/T, respectively, and the bandwidths of the subbands approximately corresponding with the critical bandwidths of the human auditory system in the frequency ranges, (b) means responsive to each of the subband signals for determining a characteristic parameter G(p;m) which is representative of the signal level in a block having a same number of M signal samples for each subband, $\underline{m}$ being the number of the blocks; and (c) means for adaptively quantizing the blocks of the respective subband signals in response to the respective characteristic parameters G(p;m), wherein said means for adaptively quantizing for each of the subbands having a band number $\underline{p}$ smaller than $p_{lm}$ are arranged for the quantizing of the subband signals with a fixed numbers of B(p) bits, the subband having band numbers $p_{lm}$ being situated in the portion of the audio music signal band with the lowest thresholds for masking noise in critical bands of the human auditory system by single music tones in the center of the respective critical bands, said coder further including (d) bit allocation means responsive to the respective characteristic parameters G(p;m) of the subbands having a band number $\underline{p}$ not smaller than $p_{lm}$ within an allocation window having a duration equal to the block length for the subband having the band number $p_{lm}$, for allocating a number of B(p;m) bits for a predetermined fixed total number of B bits for the allocation window to the quantizing means in the coder for the signal block having block number $\underline{m}$ of the subband having band number $\underline{p}$, the bit allocation means each comprising (i) comparator means for comparing within each allocation window the characteristic parameters G(p;m) to respective thresholds T(p) for the subbands having band number $\underline{p}$ and for generating respective binary comparator signals C(p;m) having a first value C(p;m)="1" for a parameter G(p;m) not smaller than the threshold T(p) and a second value C(p;m)="0" in the opposite case, these thresholds T(p) being related to the thresholds, of the human auditory system for perceiving just single music tones., (ii) means for storing a predetermined allocation pattern {B(p)} of numbers of B(p) quantizing bits for subbands having respective band numbers $\underline{p}$, these numbers B(p) being related to respective band numbers $\underline{p}$, these numbers B(p) being related to the thresholds for masking noise in the critical bands of the human auditory system by single music tones in the center of the respective critical bands, (iii) means for determining an allocation pattern {B(p;m)} of respective numbers of B(p;m) quantizing bits for the signal block having the block number $\underline{m}$ of the subband having band number $\underline{p}$, in response to the allocation pattern stored {B(p)} and the respective characteristic parameters G(p;m) and comparator signals C(p;m), the allocation pattern {B(p;m)} being equal to the allocation pattern stored {B(p)} if all comparator signals C(p;m) within an allocation window have the said first value C(p;m)="1" and, in the opposite case, the allocation pattern {B(p;m)} bing formed by not allocating quantizing bits to blocks within an allocation window having a comparator signal of the said second value C(p;m)="0" and by allocating the sum S of the numbers of B(p) quantizing bits available within an allocation window for the latter blocks in the allocation pattern stored {B(p)} to the blocks within an allocation window having a comparator signal of the said first value C(p;m)="1" and having the largest values of the characteristic parameter G(p;m) for obtaining numbers of B(p;m) quantizing bits which are greater than the corresponding numbers of B(p) quantizing bits in the allocation patter stored {B(p)}, and (iv) means for supplying the allocation pattern {B(p;m)} determined thus to the respective quantizing means in the coder.

4. An encoder according to claim 1, wherein said bit allocation means further includes means which in response to successive characteristic parameters G(p;m) and G(p;m+1) of each subband of band number $\underline{p}$ exceeding $p_{im}$ do not allocate quantizing bits to block (p;m+1) and add the numbers of B(p;m+1) quanitizing bits available for this block to the said sum S if the ratio Q=G(p;m)/G(p;m+1) is greater than a predetermined value R(p) of the order of ten to the power of two and block (p;m+1) is situated within the allocation window, and do not allocate quantizing bits to block (p;m) and add the numbers of B(p;m) quantizing bits available for this block to the said sum S, if the ratio Q=G(p;m)/G(p;m+1) is smaller than the value 1/R(p) and the block (p;m) is situated within the allocation window.

* * * * *